(12) United States Patent
Ortiz et al.

(10) Patent No.: US 6,194,525 B1
(45) Date of Patent: Feb. 27, 2001

(54) POWDER COATING COMPOSITION COMPRISING UNSATURATED POLYESTERS AND USES THEREOF

(75) Inventors: Carlos E. Ortiz, Litchfield; Atam P. Sahni, Solon; Gerald W. Drabeck, Ravenna; Anthony S. Scheibelhoffer, Norton; Susan M. Sobek, Brunswick; Douglas E. Brand, Cuyahoga Falls, all of OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/075,965

(22) Filed: May 11, 1998

(51) Int. Cl.$^7$ ............................. C08G 63/48; C08L 67/06
(52) U.S. Cl. ............................. 525/934; 525/42; 525/43; 525/44; 428/482
(58) Field of Search ............................. 525/42, 445, 934; 428/482; 526/227

(56) References Cited

U.S. PATENT DOCUMENTS

| | | | |
|---|---|---|---|
| 4,075,261 | 2/1978 | Fujiyoshi et al. | 260/850 |
| 4,873,274 | 10/1989 | Cummings et al. | 523/500 |
| 4,980,113 | * 12/1990 | Cummings et al. | 264/255 |
| 5,350,810 | * 9/1994 | DeGraaf et al. | 525/445 |
| 5,470,912 | * 11/1995 | Loar | 525/58 |
| 5,480,726 | * 1/1996 | Richart | 428/482 |
| 5,593,730 | 1/1997 | Satgurunathan et al. | 427/386 |
| 5,763,099 | * 6/1998 | Misev et al. | 428/482 |

\* cited by examiner

*Primary Examiner*—David W. Wu
*Assistant Examiner*—Tanya Zalukaeva
(74) *Attorney, Agent, or Firm*—Rankin, Hill, Porter & Clark LLP

(57) ABSTRACT

The powder coating composition of the present invention includes a low-temperature mixture of a powder (A) and a powder (B), in which at least the powder (A) includes an unsaturated polyester resin and a free radical initiator for initiating polymerization of unsaturated polyester resins in the powder coating composition and the powder (B) includes a polymerization promoter and methods for making the composition. The powder (B) may further include an unsaturated polyester. The powders (A) and (B) are physically mixed at temperatures below which the polymerization promoter would cause the free radical initiator to initiate polymerization of the powder coating composition. Subsequently, the physically mixed powder coating composition is applied to a substrate and cured, during which the polymerization promoter causes the free radical initiator to initiate the curing reaction.

16 Claims, No Drawings

POWDER COATING COMPOSITION COMPRISING UNSATURATED POLYESTERS AND USES THEREOF

FIELD OF THE INVENTION

This invention relates to powder coating compositions including unsaturated polyester resins and methods of using the same.

BACKGROUND OF THE INVENTION

Previously known thermosetting powdercoating compositions utilizing unsaturated polyester resins and reactive polymerization initiators have suffered from problems arising from the reactive nature of the ingredients, in particular, problems of premature curing. Generally, all ingredients required for curing the composition have to be contained and uniformly distributed in the powder coating composition when it is applied to an article, which may include a mold, on the surface of which the coating is to be formed. To obtain the requisite uniform distribution of the ingredients, the powder must be thoroughly mixed. Melt mixing, followed by granulation of the mixture, has long been a preferred method of mixing. However, melt mixing has had to be carefully carried out in order to avoid premature curing of thermally labile resins used in the powder coating compositions. As a result of efforts to avoid the problem of premature curing of the powder coating, the mixing was frequently incomplete, resulting in non-uniform distribution of the ingredients and poor quality coatings.

Three temperatures are important for powder coating compositions and powder components thereof. The first of these is referred to as the glass transition temperature (Tg) or melting point (mp) of the powder. In addition to determining the stability of the powder to fusion, this temperature also contributes to and affects significantly the second important temperature, which is referred to as the melt process temperature. Generally, the melt process temperature should be sufficiently above the Tg of the mixture so that the viscosity will be optimal to achieve good mixing. The melt process temperature, in turn, sets limits upon the third important temperature for thermosetting powder coating compositions, which is the cure temperature. The cure temperature should be sufficiently above the melt processing temperature so that cure does not begin during the melt processing or mixing step of the process.

Thus, the three important temperatures are intimately interrelated. A reasonable temperature increment should be maintained between each of these temperatures, but particularly between the melt processing temperature and the cure temperature. As a result of these relationships between the three important temperatures, attempts to reduce the cure temperature generally result in reducing the increments between the three temperatures or in forcing the lowering of the other two temperatures. Of course, reducing the temperature increment between the melt process temperature and the cure temperature is not desirable because the mixture may begin to cure while it is being mixed. Lowering of each of the three temperatures in order to maintain the temperature increments is also not desirable because a drop in the glass transition or melt temperature of the mixture results in a powder with a decreased resistance to fusion, sintering or blocking at ambient temperatures encountered in the normal handling of powder coating compositions.

U.S. Pat. No. 4,075,261, issued Feb. 21, 1978 to Fujiyoshi et al. ("Fujiyoshi") discloses a powder coating composition comprising (1) an unsaturated polyester which is prepared by reacting terephthalic acid or its lower alkyl ester and an α-olefinic dicarboxylic acid and optionally an organic acid having at least three carboxy groups in the molecule or its functional derivative, and an aliphatic or alicyclic glycol; and (2) an organic peroxide and a molecular crosslinking or bridging agent. Fujiyoshi teaches mixing the composition in a conventional manner, i.e., homogeneously compounding in a mixer, roll mill or kneader, followed by grinding to the desired small particle size.

U.S. Pat. No. 4,873,274, issued Oct. 10, 1989 to Cummings et al. ("Cummings") discloses an unsaturated polyester resin coating powder composition consisting essentially of at least one unsaturated polyester resin; at least one copolymerizable second resin; and an initiator which comprises 1,1'-di(t-butylperoxy)-3,3,5-trimethylcyclohexane, or which contains a small proportion of a fast initiator and a relatively large proportion of a slow initiator.

U.S. Pat. No. 5,593,730, issued Jan. 14, 1997 to Satgurunathan et al. ("Satgurunathan") discloses a powder coating composition which comprises a hybrid polymer system in which granular form of a polymer A formable from monomer(s) by aqueous suspension polymerization and a polymer B, different to A, which polymer system has been obtained using a process which comprises dissolving polymer B in monomeric material to be used in the formation of polymer A, and polymer A and polymer B bear functional groups for imparting curability to the hybrid polymer system.

The present invention solves the problem of uniformly and completely mixing together the components of a thermosetting powder coating composition prior to actual use of the powder to form a coating while avoiding premature curing of the composition.

SUMMARY OF THE INVENTION

The present invention provides a powder coating composition comprising a low-temperature physical mixture of a powder (A) comprising a first unsaturated polyester resin and a free radical initiator, and a powder (B) comprising a polymerization promoter. The present invention further provides methods of making and using the powder coating composition. The compositions and processes of this invention provide a powder coating composition which cures at a lower temperature and more rapidly than conventional powder coating compositions and processes which advantageously employ the powder coating compositions of the present invention.

DESCRIPTION OF THE PREFERRED EMBODIMENTS

Fast, low temperature curable powder coatings are achieved in this invention through the use of a physical mixing of two or more powders having different compositions. The compositions of the powders are selected such that each powder contains an ingredient which is needed for curing but is absent from the other powder. This separation allows preparation of the individual powder compositions in a heated state (such as by melt mixing) without the initiation of the cure reaction. The powdered components containing the active ingredients, after melt-mixing, can then be physically mixed to form a homogenous powder coating composition in a low-temperature dry, non-molten state, at temperatures below the activation temperature for curing. The physically mixed powders for the powder coating composition may be packaged for later use. The powder coating composition in use is applied to a substrate for forming a coating on the substrate by curing at an elevated temperature. Upon heating, the active ingredients of the powders react together resulting in a rapid cure at a relatively low temperature. The low temperature cure which is achievable with this two-component powder coating composition would not be possible if the active components had been combined in the melt state, in which they would immediately react and cause premature cure of the powder coating composition.

In this invention, we have discovered a novel composition and a novel process which can be used with the composition to achieve a significant reduction in powder coating cure temperatures while retaining (1) an economically short cure time, (2) the standard melt processing temperatures and (3) the stability of the powder at ambient temperatures. These benefits have been achieved by using a process in which standard melt-mixing equipment is used to prepare two separate powders. Each of these powders contains an insufficient quantity of the active cure ingredients to cause cure at the usual melt-mixing and processing temperatures employed, so that the individual powders do not cure prematurely during processing of the powders. Separation of the active cure ingredients in this manner allows the ingredients for each of the powders to be processed in standard melt-mixing equipment and at standard processing temperatures. The melt-mixed ingredients are subsequently formed into powders. The two powders may then be physically mixed. Upon application to a substrate and heating to melting and curing temperature, the active ingredients from the two powders coalesce and cure begins.

In the specification and appended claims, the term powder coating composition refers to the combined two powder coating composition. The term powder refers to compositions containing various materials as described herein, which are generally solid, finely-dispersed particulates having an average particle sizes in the range from about 5 microns to about 150 microns, preferably in the range from about 20 microns to about 50 microns. Here as well as through the specification and claims, the range and ratio limits may be combined.

Polyester Resin

The present invention provides a powder coating composition comprising a mixture of (A) a first powder comprising a first unsaturated polyester resin and a free radical initiator, and (B) a second powder, comprising a polymerization promoter. The powder coating composition may further include one or more additional unsaturated polyester resins. If the second or subsequent unsaturated polyester resins are in the second powder (B), they may be the same as or different from the resins in the first powder (A).

The unsaturated polyester resin is typically the condensation product of an unsaturated polycarboxylic acid or its derivative (anhydrides, $C_{1-8}$ alkyl esters, halides, etc.) and a polyhydroxy alcohol. The unsaturated polyester may be prepared from a mixture of unsaturated acids and saturated acids reacted with one or more polyhydroxy alcohol. The polyester resin usually encompasses from about 40% to about 80%, or preferably from about 50% to about 70%, or more preferably from about 55% to about 60% by weight of the powder coating composition. The molecular weight distribution is typically from about 1.5 to about 8, and preferably from about 2 to about 5.

The powder coating composition includes one or more unsaturated polyester resins. The unsaturated polyester resins are preferably maleate or fumarate polyester resins, having a molecular weight [or melt index or other characteristics] in the range of about 1,000 to about 10,000, more preferably in the range of about 2500 to about 7500, and most preferably in the ranger from about 4000 to about 6000.

Unsaturated polyester resins are typically reaction products of unsaturated and optionally saturated polybasic carboxylic acids or their derivatives and polybasic alcohols. The carboxylic acids and their derivatives are typically dibasic unsaturated, preferably α,β-olefinically unsaturated, carboxylic acids or their derivatives. Examples of these carboxylic acids and their α,β-olefinically substituted derivatives include maleic acid, fumaric acid, chloromaleic acid, itaconic acid, citraconic acid, methyleneglutaric acid and mesaconic acid and their esters or preferably their anhydrides, as well as succinic acid, glutaric acid, d-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, dodecanedicarboxylic acids, nadic anhydride, cis-5-norbornene-2,3-dicarboxylic acid or anhydride, dimethyl-2,6-naphthenic dicarboxylate, dimethyl-2,6-naphthenic dicarboxylic acid, naphthenic dicarboxylic acid or anhydride and 1,4-cyclohexane dicarboxylic acid. Monobasic, tribasic or higher polybasic carboxylic acids, for example ethylhexanoic acid, methacrylic acid, propionic acid, benzoic acid, 1,2,4-benzenetricarboxylic (trimellitic) acid or 1,2,4,5-benzenetetracarboxylic acid may also be used in preparing the polyester resins.

As described above the unsaturated polyester resin is prepared from polyhydric alcohols, having 2,3,4, or more hydroxy groups, preferably glycols. Suitable polyhydric alcohols include alkanediols and oxa-alkanediols, for example, ethylene glycol, 1,2-propylene glycol, propane-1,3-diol, 1,3-butylene glycol, butene-1,4-diol, hexane-1,6-diol, 2,2-dimethylpropane-1,3-diol, diethylene glycol, triethylene glycol, polyethylene glycol, cyclohexane-1,2-diol, 2,2-bis-(p-hydroxycyclohexyl)-propane, butene-1,4-diol, 5-norbornene-2,2-dimethylol, 2,3-norbornene diol, cyclohexane dimethanol, neopentyl glycol, dimethylpropane-1,3-diol, 2,2-dimethylheptanediol, 2,2-dimethyloctanediol, 2,2-dimethyl-1,3-propanediol, pentaerythritol, dipentaerythritol, tripentaerythritol, trimethylolpropane, di-trimethylolpropane, 2,2,4-trimethyl-1,3-pentanediol, 2-butyl-2-ethyl-1,3-propanediol, 3-hydroxy-2,2-dimethylpropyl 3-hydroxy-2,2-dimethyl propanate, bisphenol-A, etc. The polyhydroxy alcohols typically have from about 2 to about 18, from about 3 to about 12, and preferably from about 4 to about 8 carbon atoms. Preferably the polyhydric alcohols are neopentyl glycol and propylene glycol. These polyhydric alcohols are generally present in an amount from about 33% to about 67%, more preferably from about 45% to about 55% by mole.

The unsaturated polyester resins may be prepared by usual esterification means known to those skilled in the art. Commercial polyester resins are available as ortho- or iso-forms of the aromatic dicarboxylic acid components from many companies. Examples of these companies include Reichhold Chemical, Ashland Chemical, Hüls AG, Alpha Resin, and Pioneer Plastics.

Copolymerizable Resins

The unsaturated polyester resins used in the present invention may be used together with copolymerizable resins having ethylenic unsaturation, and preferably having two or more sites of unsaturation per molecule, although resins having one site of unsaturation may be used. Most preferred are prepolymers which are solid at or near room temperature so that they can easily be formulated into powders. The preferred copolymerizable resins are diallyl phthalate prepolymers, iso-diallyl phthalate prepolymers, and para-diallyl phthalate prepolymers.

The diallyl phthalate prepolymer is added to the present powder coating compositions in the range of about 10 to about 35 percent by weight, preferably in the range of about 15 to about 30 percent by weight, and more preferably in the range of about 20 to about 25 percent by weight of the powder coating composition or of each separate unsaturated polyester resin-containing powder, and vinyl ether prepolymers.

Crystalline unsaturated monomer

In one embodiment, the powder coating composition may further include a crystalline unsaturated monomer. The crystalline unsaturated monomer typically comprises from about 1% to about 25%, or preferably from about 5% to about 20%, or more preferably from about 7% to about 20% by weight of the powder coating composition. The unsaturated monomer is preferably an ethylenically unsaturated, monomeric compound, which include allyl and vinyl compounds conventionally known and used for the preparation of unsaturated polyester moldings, impregnating and coating compositions, and which are preferably solids at room temperature when physically mixed into the resin mixtures.

In one embodiment the crystalline unsaturated monomer is preferably selected from diacetone acrylamide (monomer or dimer), triallyl cyanurate, N,N'-methylene bisacrylamide, N,N'-diallylmelamine, acrylamide, triallylisocyanurate, neopentyl glycol diacrylate, copolymers of maleic anhydride and alkylene oxides, for example, propylene oxide, ethylene oxide, and others, maleinimide, pentaerythritol tetraacrylate, and pentaerythritol triacrylate.

Free Radical Initiator

The free radical initiators of the present invention include any material which releases free radicals to cure the powder coating compositions of the present invention. Types of free radical initiators include peroxides, diazo compounds, and other compounds capable of initiating free radicals. Free radical initiators include the following examples; 2,4-dichloro-benzoyl peroxide, diisononanoyl peroxide, decanoyl peroxide, lauroyl peroxide, succinic acid peroxide, acetyl peroxide, benzoyl peroxide, diisobutyryl peroxide, dilauryl peroxide, acetyl cyclo-hexylsulfonyl peroxide, di(n-propyl) peroxydicarbonate, di(sec-butyl) peroxydicarbonate, di(2-ethyl-hexyl) peroxydicarbonate, diisopropyl peroxydicarbonate, dicyclohexyl peroxydicarbonate, alphacumyl peroxyneodecanoate, α-cumylperoxypivalate, t-amylperoxy-neodecanoate, t-butylperoxy-neodecanoate, t-amyperoxy-pivalate, butylperoxy-pivalate, 2,5-dimethyl-2,5-di(2-ethylhexanoylperoxy)-hexane, t-amylperoxy-2-ethyl-hexanoate, t-butylperoxy-2-ethylhexanoate, t-butylperoxy-isobutyrate, 2,2'-azobis-(2,4-dimethyl-valeronitrile, azobisisobutyronitrile, 2,2'-azobis-(2-methylbutyronitrile), t-butylperoxy-maleic acid, 1,1'-azobis-(1-cyclohexanecarbonitrile), 1,1-di(t-butyl-peroxy)-3,3,5-trimethylcyclohexane, OO-t-butyl-O-isopropyl monoperoxycarbonate, 2,5-dimethyl-2,5-di(benzoylperoxy) hexane, OO-t-butyl-O-(2-ethylhexyl) monoperoxycarbonate, t-butylperoxyacetate, t-butylperoxybenzoate, di-t-butyl-diperoxyazelate, di-t-butyl diperoxyphthalate, dicumyl peroxide, 2,5-dimethyl-2,5-di(t-butyl-peroxy)hexane, t-butyl cumyl peroxide, di-t-butyl peroxide, 2,5-dimethyl-2,5-di(t-butylperoxy) hexyne-3, 2,5-dihydro-peroxy-2,5-di-methylhexane, cumene hydroperoxide, t-butyl hydroperoxide, t-amylhydroperoxide, n-butyl-4,4-bis-(t-butylperoxy)-valerate, 1,1-di(t-butyl-peroxy)3,3,5-tri-methylcyclohexane, 1,1-di(t-butyl-peroxy)cyclohexane, 1,1'-di-t-amyl-peroxycyclohexane, 2,2-dit-butyl-peroxy)butane, ethyl-3,3-di-(t-butylperoxy) butyrate, t-butyl peroctoate and 1,1-di(t-butyl-peroxy)cyclohexane blend, OO-t-butyl-O-isopropyl monoperoxycarbonate, p,p'oxybis(benzene sulfonyl hydrazide), and accelerated azocarbonamide.

In one embodiment, the powder coating composition may include more than one free radical initiator. The composition may comprise free radical initiator having a relatively low temperature of activation and a second free radical initiator having a relatively high temperature of activation. The primary difference between the low temperature and the high temperature free radical initiators is the temperature at which each is activated. A low-temperature-activated free radical initiator, as used herein, is defined as one which becomes reactive, i.e., begins to generate free radicals capable of initiating curing of the powder coating composition, at temperatures in the range of about 50° to about 120° C. in the presence of a polymerization promoter.

The low-temperature-activated free radical initiator preferably is a peroxide, more preferably an organic peroxide such as diacyl peroxide, di-t-butyl peroxide, or dicumyl peroxide, t-butyl cumyl peroxide, or benzoyl peroxide. Other examples of low-temperature peroxides are cumene hydroperoxide, para-methane hydroperoxide, t-butyl propoxyacetate, or t-butyl propoxylaurate. More preferably, the low temperature initiator is a peroxide which generates free radicals only in the presence of a catalyst at a low temperature (i.e., from about 50° C. to about 120° C.).

In one embodiment, the low-temperature free radical initiators are preferably present in amounts ranging from about 1% to about 7% of the composition of each powder in which the low-temperature free radical initiator is included. More preferably, the low-temperature free radical initiator is present in an amount ranging from about 1% to about 5%. Most preferably, the low-temperature free radical initiator is present in an amount ranging from about 2% to about 4%.

In one embodiment, the powder coating composition includes a high temperature free radical initiator in addition to the low temperature free radical initiator. The high temperature free radical initiator may be present in either or both powders (A) and (B). A greater degree of resin cure may be obtained by adding the second, high temperature-activated free radical initiator to the powder coating composition. The second free radical initiator preferably is stable at both the melt processing temperature and in the presence of the polymerization promoter at the temperature at which the first, low temperature-activated free radical initiator initiates cure. The second free radical initiator is selected to initiate cure at a higher cure temperature than the first free radical initiator. The second free radical initiator preferably only generates free radicals thermally, as a result of higher temperatures reached subsequent to the melt-mixing steps and subsequent to the initial curing of the physically mixed powders, where the initial curing is promoted by the low temperature free radical initiator and the polymerization promoter. Due to its stability, the second, higher temperature free radical initiator can be added to both powders prior to melt-mixing, including to the powder containing the polymerization promoter.

A high temperature free radical initiator, as used herein, is defined as one which becomes reactive at temperatures in the range of about 120° to about 150° C., independently of the presence of a polymerization promoter. The preferred high-temperature free-radical initiator is a peroxide. A preferred high temperature free radical initiator is benzoyl peroxide.

In one embodiment, the high-temperature peroxides are preferably present in amounts ranging from about 0.02% to about 3% of the composition of each powder in which the high-temperature peroxides are included. More preferably, the high-temperature peroxides are present in amounts ranging from about 0.5% to about 5%. Most preferably, the high-temperature peroxides are present in amounts ranging from about 0.7% to about 3%.

Polymerization Promoters

Polymerization promoters or agents are any electron donating species which promotes or assists in the decomposition of free radical initiators. The promoters are usually added to powder coating compositions to accelerate the decomposition of a free radical initiator to free radicals and thereby initiate or speed the curing of the composition at relatively low temperatures, i.e., at temperatures in the range of 70° to 130° C. The promoters are generally used in amounts ranging from about 0.001% to about 2%, or from about 0.01% to about 1%, preferably from about 0.1% to about about 0.5% by weight. Among the materials that have been reported as being effective promoter are metal compounds, such as cobalt, manganese, iron, vanadium, copper, and aluminum oxides and cobalt, manganese, iron, vanadium, copper, potassium and aluminum salts of organic acids, such as cobalt octanoate and potassium octanoate; amines, such as dimethylaniline, diethylaniline, and 2-aminopyridine and tertiary amines; Lewis acids, such as boron fluoride dihydrate and ferric chloride; bases, such as tetramethyl ammonium hydroxide; quaternary ammonium salts, such as trimethylbenzyl ammonium chloride and tetrakismethylol phosphonium chloride; and sulfur compounds, such as dodecyl mercaptan and 2-mercaptoethanol; and other compounds such as dimethyl acetoacetamide and methyl acetoacetate. Cobalt salts of organic acids are the most widely-used accelerators for the low temperature decomposition of peroxide catalysts and the curing of unsaturated polyester resin compositions. It is generally preferred that cobalt and potassium salts of aliphatic monocarboxylic acids having 5 to about 20, or from about 8 to about 12 carbon atoms or alicyclic acids having about 5 to about 7 carbon atoms be present in the promoter systems. Particularly useful promoter include COBALT HEXCHEM (cobalt octanoate) and POTASSIUM HEXCHEM (potassium octanoate), dimethyl acetoacetamide; and methyl acetoacetate.

Conventional Additives

The powder coating composition of the present invention may include other conventional additives, such as pigments, mold release agents, tribo-charging additives, flow control agents, fillers, air release (degassing) agents, light and/or UV stabilizers, and inhibitors. The primary limitation on such additives is that the additives should not either prevent the cure reaction from proceeding or cause the cure reaction to proceed uncontrollably. It is to be understood that, while some additives may interfere with the cure reaction to some degree, the formulations for the powder coating composition may be adjusted in conventional manners to compensate for such effects.

One embodiment of the powder coating composition includes a physical mixture of a powder (A) and a powder (B), in which both powders include an unsaturated polyester resin and a unsaturated monomer or resin, having a Tg or crystalline melting point from about 40° C. to about 100° C. and co-reacts with the unsaturation of the polyester resin, and wherein the first powder comprises a low temperature peroxide and the second powder comprises a polymerization promoter. In addition to these basic ingredients, the powder coating composition may further include an additional resin, such as a prepolymer of diallyl phthalate, or it may include another unsaturated polyester resin, either instead of or in addition to the diallyl phthalate prepolymer. In addition, the powder coating composition may include a high temperature free radical initiator in addition to the preferred low temperature free radical initiator.

Powder Coating Compositions

Two component powder coating compositions which illustrate the invention include various formulations comprising unsaturated polyester resins, a free-radical initiator and a polymerization promoter or other agent which promotes the decomposition of free radical initiator into free radicals and thereby initiate and promote polymerization. Such materials are described above. As described, powder (A) comprises an unsaturated polyester resin and a free radical initiator. The unsaturated resin is present in powder (A) at levels from about 40% to about 80% by weight. The free radical generator is present in powder (A) at levels from about 1% to about 7% by weight. Powder (B) comprises a polymerization promoter. The polymerization promoter may be the sole ingredient of powder (B), or powder (B) may comprise an unsaturated polyester resin, which may be the same as or different from the unsaturated polyester resin in powder (A). In an embodiment of powder (B) comprising an unsaturated polyester resin, the resin is present at levels from 40% to about 99% by weight.

The preferred unsaturated polyester resins are polymerizable or curable by free radicals, such as generated by the free radical initiator of the present invention. The free radical initiator is selected so that it is stable at the melt process temperature used to prepare the powders of the powder coating composition. Likewise the polymerization promoter is stable at the melt process temperatures used to prepare these powders. The polymerization promoter causes decomposition of the free radical initiator into free radicals when the two powders have been mixed together and the temperature is elevated to or above the temperature at which the promoter causes the initiator to generate free radicals, which causes curing and/or crosslinking of the resins.

The powder coating composition of the present invention may be prepared by a process which includes physically mixing a separate and distinct powder (A) comprising an unsaturated polyester resin and a free radical initiator and a powder (B) comprising a polymerization promoter, in which the ingredients of the powder (A) are combined by melt-mixing the ingredients and then forming them into the powder (A). The ingredients of the powder (B) may include an unsaturated polyester resin, and may be melt-mixed and then formed into the second powder (B). The physically mixing step is performed at a temperature below which the polymerization promoter causes the free radical initiator to initiate curing.

Another embodiment of a method of making the powder coating composition in accordance with the invention includes the steps of (a) forming a powder (A) from an unsaturated polyester resin and a free radical initiator, and (b) physically mixing the powder (A) with a powder (B) comprising an unsaturated polyester resin and a polymerization promoter, in which the step of physically mixing the two powders is performed at a temperature below which the polymerization promoter reacts with the free radical initiator.

A first embodiment of a powder coating composition, the formulation of which is shown below as Example 1, is formed by physically mixing two powders which may be prepared as follows:

Powder (A): One or more unsaturated polyester resins and the free radical initiator are combined by melt mixing and formed into a first powder.

Powder (B): One or more unsaturated polyester resins, which may be the same as or different from the resins in powder (A), and the polymerization promoter are combined by melt mixing and formed into a second powder.

These two powders are subsequently physically mixed as described below.

A second embodiment of a powder coating composition, the formulation of which is shown below as Example 7, may be prepared as follows:

Powder (A): One or more unsaturated polyester resins and the free radical initiator are combined by melt mixing and formed into a first powder. The first powder may be the same as or different from the powder (A) in the first embodiment.

Powder (B): The polymerization promoter in powder form but without an unsaturated polyester resin.

In both of the above embodiments the two separate powders are physically mixed after appropriate melt mixing. The physical mixing is done preferably via a high intensity mixer to achieve a homogeneous blend at a temperature below which the polymerization promoter reacts with the free radical initiator to initiate polymerization.

In the foregoing embodiments of the two-component powder coating composition, each of the two component powders, as prepared above, may be physically mixed without danger of premature cure. Upon subsequent heating in use, when the powder coating composition reaches temperatures at and above which the polymerization promoter promotes decomposition of the free radical initiator into free radicals, which initiates cure resulting in formation of the desired coating.

A third embodiment of a powder coating composition, the formulation of which is shown below as Example 4, may be prepared as follows:

Powder (A): One or more unsaturated polyester resins and both the low and high temperature free radical initiators are combined by melt-mixing and formed into a first powder.

Powder (B): One or more unsaturated polyester resins, which may be the same as or different from the resin in (A), the polymerization promoter and the high temperature free radical initiator are combined by melt mixing and formed into a second powder.

These two powders are subsequently physically mixed as described below.

A fourth embodiment of a powder coating composition, the formulation of which is shown below as Example 10, may be prepared as follows:

Powder (A): One or more unsaturated polyester resins and both free radical initiators are combined, melt-mixed, and then formed into a first powder. As with the second embodiment above, this powder may be the same as or different from the powder (A) in the third embodiment above.

Powder (B): The polymerization promoter and the second free radical initiator combined in powder form or melt-mixed and formed into a powder, without an unsaturated polyester resin.

In both the third and fourth embodiments, the two separate powders are combined after appropriate melt mixing and are physically mixed via a high intensity mixer to achieve a homogeneous blend at a temperature below which the polymerization promoter reacts with the low temperature free radical initiator to initiate polymerization.

When the powder coating compositions in the third and fourth embodiments described above are melted on the substrate, the promoter causes the low temperature free radical initiator to decompose into active free radicals to partially cure the powder coating composition. The substrate may be a mold in which or an article upon which the coating is to be formed. The cure reaction causes the resin(s) to partially set or gel in place, but not to completely cure. The partial curing provides a three-dimensionally crosslinked coating which exhibits good adhesion to the substrate. If the partially cured coating is then exposed to a higher temperature, at which the second free radical initiator preferably decomposes into active free radicals, the cure reaction proceeds further and an even more densely crosslinked coating is produced.

The embodiments including a second, high-temperature free radical initiator are especially valuable during a powder pre-mold coating operation in which the powder is applied to a heated tool (the substrate) and a reaction injection molding operation (known as "reaction in mold" or "RIM") is performed. The second curing step of the mold coating operation takes place at or above the temperature at which the first, low temperature free radical initiator is activated by the polymerization promoter. Thus, a stable three-dimensionally crosslinked coating substrate is formed by this reaction inside the mold. The filler material may subsequently be inserted into the mold. The RIM substrate requires an additional cure cycle and it is during this stage that the second, higher temperature free radical initiator is activated by the higher temperature in the mold during that portion of the molding operation.

EXAMPLES

The following examples relate to preparation of the powder coating compositions of the present invention. Unless otherwise specified, in the examples as well as elsewhere in the specification and claims, weights are in grams, and percentages are by weight, the temperature is in degrees Celsius, and pressure is atmospheric pressure.

The following Examples 1–3 pertain to powders (A) and (B) as described above for the first embodiment of the invention.

Example 1

|  | Powder (A) weight, g. | Powder (B) weight, g. |
| --- | --- | --- |
| Unsaturated polyester resin A | 56.3 | 56.3 |
| Peroxide | — | 3.7 |
| Polymerization promoter | 1.1 | — |
| TOTAL WEIGHT | 57.4 | 60.00 |

Example 2

|  | Powder (A) weight, g | Powder (B) weight, g |
| --- | --- | --- |
| Unsaturated polyester resin A | 56.3 | 56.3 |
| Diallyl phthalate resin | 23.2 | 23.2 |
| Unsaturated Monomer A | 4.1 | 4.1 |
| Peroxide | — | 3.7 |
| Polymerization promoter | 1.1 | — |
| TOTAL WEIGHT | 84.7 | 87.3 |

Example 3

|  |  | Powder (A) weight, g. | Powder (B) weight, g. |
|---|---|---|---|
| Unsaturated polyester resin A |  | 56.3 | 56.3 |
| Diallyl phthalate resin |  | 23.2 | 23.2 |
| Diacetone acrylamide (McWhorter 30-3011) |  | 4.1 2.7 | 4.1 2.7 |
| Pigments: | Harcros Pigment Black 11 | 4.488 | 4.488 |
|  | Harcros Pigment Red 101 | 0.044 | 0.044 |
|  | Laport Pigment Brown 11 | 1.155 | 1.155 |
|  | Ferro Ultramarine Blue | 0.125 | 0.125 |
| Zinc stearate |  | 2.0 | 2.0 |
| Ciba Tinuvin 144 |  | 0.4 | 0.3 |
| Synthron Modarez MFP |  | 0.3 | 0.3 |
| Benzoin |  | 0.5 | 0.5 |
| t-butyl perbenzoate (50% active) |  | — | 3.7 |
| 2,5-dimethyl-2,5-di(benzoylperoxy)hexane |  | — | 3.7 |
| Cobalt HEXCEM |  | 1.1 | — |
| t-butyl catechol |  | 0.01 | 0.01 |
| TOTAL WEIGHT |  | 95.098 | 101.298 |

The weights shown in each example for each ingredient of powder (A) and powder (B) are combined, melt-mixed, and granulated into powders. The resultant powder (A) and powder (B) are combined and physically mixed in a mixer.

The following Examples 4–6 include powders (A) and (B) as described above for the third embodiment of the invention.

Example 4

|  | Powder (A) weight, g. | Powder (B) weight, g. |
|---|---|---|
| Unsaturated polyester resin B | 48.2 | 48.2 |
| TBPB (50% act) | 3.0 | — |
| Cobalt hexcem | — | 0.9 |
| BPO (50% act) | 0.7 | 0.7 |
| TOTAL WEIGHT | 51.9 | 49.8 |

Example 5

|  | Powder (A) weight, g. | Powder (B) weight, g. |
|---|---|---|
| Unsaturated polyester resin B | 48.2 | 48.2 |
| Unsaturated polyester resin C | 16.1 | 16.1 |
| Diallyl phthalate resin | 17.5 | 17.5 |
| Diacetone acrylamide | 3.4 | 3.4 |
| TBPB (50% act) | 3.0 | — |
| Cobalt HEXCEM | — | 0.9 |
| BPO (50% act) | 0.7 | 0.7 |
| TOTAL WEIGHT | 88.9 | 86.8 |

Example 6

|  | Powder (A) weight, g. | Powder (B) weight, g. |
|---|---|---|
| Unsaturated polyester resin B | 48.2 | 48.2 |
| Unsaturated polyester resin C | 16.1 | 16.1 |
| Diallyl phthalate resin | 17.5 | 17.5 |
| Diacetone acrylamide | 3.4 | 3.4 |
| McWhorter 30-3011 | 2.7 | 2.7 |
| Pigments | 5.8 | 5.8 |
| Zinc stearate | 2.0 | 2.0 |
| Ciba Tinuvin 144 | 0.4 | 0.4 |
| Synthron Modarez MFP | 0.3 | 0.3 |
| Benzoin | 0.5 | 0.5 |
| 2,5-dimethyl-2,5-di(benzoylperoxy)hexane | 3.0 | — |
| Cobalt HEXCEM | — | 0.9 |
| BPO (50% act) | 0.7 | 0.7 |
| t-butyl catechol | 0.01 | 0.01 |
| TOTAL WEIGHT | 100.61 | 98.51 |

In Examples 3–6, the actual materials used were the same as in Example 3, except as indicated. Peroxide C was benzoyl peroxide (50% active); the actual commercial material used was Akzo Cadox BFF-50.

Example 7

|  | Powder (A) weight, g. | Powder (B) weight, g. |
|---|---|---|
| Unsaturated polyester resin B | 74.1 | 74.1 |
| DSM ZW3307P | 13 | 13 |
| Pigment | 5 | 5 |
| Zinc stearate | 2 | 2 |
| Synthron Modarez MFP | 0.3 | 0.3 |
| Benzoin | 0.5 | 0.5 |
| Ciba Tinuvin 144 | 1 | 1 |
| Ciba Tinuvin 900 | 2 | 2 |
| t-butyl perbenzoate (50% act) | 4 | — |
| t-butyl catechol | 0.01 | 0.01 |
| Cobalt HEXCEM | — | 0.2 |
| TOTAL WEIGHT | 101.9 | 98.1 |

The weights shown in each above example for each ingredient of powder (A) and powder (B) are combined, melt-mixed, and granulated into powders. The resultant powder (A) and powder (B) are combined and physically mixed in a mixer.

In the foregoing examples 1–6, the following resins were employed:

| Unsaturated polyester resin A | Reichhold Fine-clad 385 |
|---|---|
| Unsaturated polyester resin B | Pioneer P202-HV |
| Unsaturated polyester resin C | Pioneer P8000-F |

The following Examples 8–10 and 11–13 illustrate the third and fourth embodiments, respectively, of the invention as described above, in which the second powder does not include an unsaturated polyester resin. In some formulations, the second powder may include other components in addition to the polymerization promoter. Generally, in the following exemplary formulations, the first powder is identical to one of the first powders ((A) or (A')) in Examples 1–6.

Example 8

|  | weight, g. |
| --- | --- |
| Powder (A), from Example 1 (above) | 99.4 |
| (B) Polymerization promoter | 0.6 |
| TOTAL WEIGHT | 100.0 |

Example 9

|  | weight, g. |
| --- | --- |
| Powder (A), from Example 2 (above) | 99.4 |
| (B) Polymerization promoter | 0.6 |
| TOTAL WEIGHT | 100.0 |

Example 10

|  | weight, g. |
| --- | --- |
| Powder (A), from Example 3 (above) | 99.4 |
| (B) Polymerization promoter | 0.6 |
| TOTAL WEIGHT | 100.00 |

The weights shown in each above example for each ingredient of the powders (A) are combined, melt-mixed, and granulated into powders. The resultant powders (A) and the polymerization promoter are combined and physically mixed in a mixer.

Example 11

|  | weight, g. |
| --- | --- |
| Powder (A), from Example 4 (above) | 99.4 |
| (B) Polymerization promoter | 0.6 |
| TOTAL WEIGHT | 100.0 |

Example 12

|  | weight, g. |
| --- | --- |
| Powder (A), from Example 5 (above) | 99.4 |
| (B) Polymerization promoter | 0.6 |
| TOTAL WEIGHT | 100.0 |

Example 13

|  | weight, g. |
| --- | --- |
| Powder (A), from Example 6 (above) | 99.4 |
| (B) Polymerization promoter | 0.6 |
| TOTAL WEIGHT | 100.0 |

The weights shown in each above example for each ingredient of the powders (A) are combined, melt-mixed, and granulated into powders. The resultant powders (A) and the polymerization promoter are combined and physically mixed in a mixer.

The following examples 14–19 demonstrate additional embodiments of the invention.

|  | Example 14 | | Example 15 | | Example 16 | | Example 17 | | Example 18 | | Example 19 | |
| --- | --- | --- | --- | --- | --- | --- | --- | --- | --- | --- | --- | --- |
|  | (A) | (B) | (A) | (B) | (A) | (B) | (A) | (B) | (A) | (B) | (A) | (B) |
| Unsaturated polyester resin A | 50.0 | — | 25.0 | — | 56.3 | 56.3 | 50.0 | 50.0 | 30.0 | — | 45.0 | — |
| Unsaturated polyester resin B | — | — | 25.0 | — | — | — | — | — | — | — | — | — |
| Unsaturated polyester resin C | — | — | — | — | — | — | — | — | — | — | — | — |
| Diallyl phthalate resin | — | — | — | — | 23.2 | 23.2 | — | — | 20.0 | — | — | — |
| Crystalline Unsaturated Monomer | — | — | — | — | 4.1 | 4.1 | — | — | 2.5 | — | 5.0 | — |
| Peroxide A (low temperature) | 2.5 | — | 2.5 | — | 3.7 | — | 5.0 | — | — | — | 2.5 | — |
| Peroxide B (low temperature) | — | — | — | — | — | 3.7 | — | — | — | — | — | — |
| Polymerization promoter | — | 0.1 | — | 0.1 | — | 1.1 | — | 0.1 | — | 0.1 | — | 0.1 |
| TOTAL WEIGHT | 52.5 | 0.1 | 52.5 | 0.1 | 91 | 84.7 | 55.0 | 50.1 | 52.5 | 0.1 | 52.5 | 0.1 |

|  | Example 20 | | Example 21 | | Example 22 | | Example 23 | | Example 24 | | Example 25 | |
| --- | --- | --- | --- | --- | --- | --- | --- | --- | --- | --- | --- | --- |
|  | (A) | (B) | (A) | (B) | (A) | (B) | (A) | (B) | (A) | (B) | (A) | (B) |
| Unsaturated polyester resin A | 25.0 | — | 50.0 | — | 56.3 | — | 56.0 | — | 36.0 | 56.0 | 36.0 | — |
| Unsaturated polyester resin B | 25.0 | — | — | 50.0 | — | 56.3 | — | 56.0 | — | — | — | 56.0 |
| Unsaturated polyester resin C | — | 25.0 | — | — | — | — | — | — | 20.0 | — | 20.0 | — |
| Diallyl phthalate resin | — | — | — | — | — | — | 23.0 | 23.0 | 23.0 | 23.0 | 23.0 | 23.0 |
| Crystalline Unsaturated Monomer | — | — | 4.0 | 4.0 | 4.0 | 4.0 | 4.0 | 4.0 | 4.0 | 4.0 | 4.0 | 4.0 |
| Peroxide A (low temperature) | 3.5 | — | 5.0 | — | 6.0 | — | 3.5 | — | 3.5 | — | 3.5 | — |

-continued

| | 1 | 2 | 3 | 4 | 5 | 6 | 7 | 8 | 9 | 10 | 11 | 12 |
|---|---|---|---|---|---|---|---|---|---|---|---|---|
| Peroxide B (low temperature) | — | — | — | — | — | — | — | — | 3.5 | — | 3.5 | — |
| Peroxide C (high temperature) | — | — | — | — | 2.0 | — | 3.0 | — | 0.5 | 0.5 | 0.5 | 0.5 |
| Polymerization promoter | — | 0.1 | — | 0.2 | — | 1.1 | — | 1.1 | — | 1.0 | — | 1.1 |
| TOTAL WEIGHT | 53.5 | 25.1 | 59.0 | 54.2 | 68.3 | 61.4 | 89.5 | 84.1 | 90.5 | 84.5 | 90.5 | 84.6 |

Note:
All component quantities are weights, in grams.

Processing Conditions:

The term "melt mixing" is defined as the process of mixing components under conditions in which the mixture is generally in a liquid condition, although some components of the mixture may be present as suspended or dispersed solids or may be dissolved rather than molten. Melt mixing includes various known methods of homogeneously compounding materials by melting some or all of the components at elevated temperatures, including the use of screw extruders, two roll mill, and ribon blender.

The term "physically mixing" is defined as the mixing of components under dry, non-molten conditions, i.e., in the solid state and without substantial melting of the components being mixed. Physical mixing includes various known methods of homogeneously compounding materials, including use of a bladed mixer, a roll mill or a kneader, whereby the combined materials are generally uniformly distributed throughout the resulting mixture. As used herein, physically mixing, when referring to combining the individual powder components to form the powder coating composition, means that the temperature of the combined powders during the mixing process does not reach the temperature at which the polymerization promoter causes the free radical initiator to initiate the curing reaction of the unsaturated polyester resins in the powder coating composition.

All ingredients in each of the powders (A) and (B) in the above examples are pre-mixed in a high intensity mixer equipped with a cooling jacket for 1.5 minutes. They are then melt mixed using a Baker-Perkins 50 mm twin screw extruder. The screw and barrel temperature is set at 65° C. and the screw is run at 300 rpm. 20–30% torque is produced and extrudate temperatures are between 91° C. and 113° C. The extrudate is cooled by passing through a pair of chill rolls. The resultant material is milled and screened through a 170 mesh screen. The powders are then physically mixed in the approximately 50:50 ratio for Powders (A) and (B) shown in Examples 1–6.

In the cases of Examples 7–12, in which the polymerization promoter is used uncombined with other ingredients, the polymerization promoter is measured into the appropriate powder (A) or formed by melt-mixing and powdering, and the resulting mixture is subjected to a high intensity physical mixing. The powders from all of Examples 1–12 are each applied using a tribo gun onto a heated 12"×12" plaque tool mounted on a 150 ton press. A fiberglass preform is placed on top of the coating, the press is closed and two streams making up a RIM formulation are injected.

Applications Employing the Methods

The above powder coating compositions may be used in a variety of applications which include gelcoating, resin lamination, pultrusion, sheet molding compounding, bulk molding compounding, etc. The coating and articles of manufacture include sinks, countertops, shower stalls/tubs, spas, boat hulls, patio brick coatings, etc.

The powder coating composition may be used together with other additives to form gelcoats and polyester articles. The applications may include the spray-up manufacture of coating and articles. In this method, one or more of the above powder coating compositions is fed into a spray gun along with fillers, such as chopped fiberglass, mica and/or thixotropic agents such as fumed silica or precipitated silica. The powder coating composition may be mixed with the fibers internal or external to the spray gun. Another method of using powder coating compositions is the hand lay-up method of fabrication. In this method fiberglass, as roving or chopped fibers, is added to an open mold and the powder coating composition is "wetted out" on the fiberglass by hand rollers, brushes and squeegees. In another method, referred to as "pultrusion," roving fiberglass strands are pulled through a powder coating composition bath and through a heated die.

One embodiment of the method for using the powder coating composition of the present invention is to make a powder coated molded article. The preferred method of making such an article includes the steps of: (a) forming a powder (A) comprising an unsaturated polyester resin and a free radical initiator; (b) forming a powder (B) comprising a polymerization promoter; (c) physically mixing (A) and (B) to form a powder coating composition; (d) applying the powder coating composition to a mold; (e) forming an article in the mold; (f) curing the composition to form a coating on the article.

In one embodiment, (a) includes melt-mixing a first mixture comprising an unsaturated polyester resin, a diallyl phthalate resin, a crystalline unsaturated monomer, and a free radical initiator, includes forming (A) from the melt-mixed first mixture.

In one embodiment, the method further includes the steps of melt-mixing a second mixture comprising an unsaturated polyester resin, a diallyl phthalate resin, a crystalline unsaturated monomer, and a polymerization promoter, and forming the powder (B) from the melt-mixed second mixture.

In one embodiment, the method includes physically mixing (A) with (B) at a temperature below which the polymerization promoter causes the free radical initiator to initiate curing of the resins.

In one embodiment, the powder coating composition further comprises a high temperature free radical initiator, and the method further includes a step of increasing the temperature in the mold to further cure the coating, after an initial curing step initiated by the low temperature free radical initiator and the polymerization promoter.

In one embodiment, the method is employed for coating an article and comprises the steps of: (a) forming a powder (A) comprising an unsaturated polyester resin and a free radical initiator; (b) physically mixing powder (A) with a powder (B) comprising a polymerization promoter to form a powder coating composition; (c) applying the powder coating composition to an article; and (d) curing the powder coating composition to form a coating on the article.

One embodiment of the method preferably is performed with a powder (A) including as the free radical initiator, a low temperature peroxide and may also include in at least one of the powders a high temperature peroxide.

One embodiment of the method includes, a step of forming a second powder (B) comprising an unsaturated polyester resin together with the polymerization promoter, and forming the second powder (B) by melt-mixing the second mixture and subsequently forming the second powder (B) by grinding or otherwise forming a powder from the second mixture after it has been melt-mixed, as was done with the first powder (A).

One embodiment of the method includes the following steps to make a coated molded article using the powder coating composition of the present invention. This embodiment includes the steps of, (a) melt-mixing a first mixture comprising an unsaturated polyester resin, a diallyl phthalate resin, a crystalline unsaturated monomer, and a free radical initiator, (b) forming a first powder (A) from the melt-mixed first mixture, (c) melt-mixing a second mixture comprising an unsaturated polyester resin, a diallyl phthalate resin, a crystalline unsaturated monomer, and a polymerization promoter, (d) forming a second powder (B) from the melt-mixed second mixture, (e) physically mixing the first powder with the second powder at a temperature below which the polymerization promoter causes the free radical initiator to initiate polymerization to form the powder coating composition, (f) applying the physically mixed powder coating composition to a mold, and, (g) forming an article with the mold at a temperature at or above which the polymerization promoter reacts with the free radical initiator to initiate polymerization.

In one embodiment of this method, the powder coating composition further comprises a high temperature free radical initiator, and the method further includes a step of increasing the temperature of the coating to further cure the coating.

One embodiment of the method of coating an article includes the steps of (a) forming a powder coating composition by forming a powder (A) from an unsaturated polyester resin and a free radical initiator and physically mixing the powder (A) with a powder (B) including a polymerization promoter; (b) applying the physically mixed powder coating composition to an article; and (c) curing the powder coating composition to form a coating on the article.

One embodiment of the method of forming a molded article includes the steps of (a) forming a powder (A) from an unsaturated polyester resin and a free radical initiator, (b) physically mixing the powder (A) with a powder (B) comprising a polymerization promoter, in which the physically mixing step is performed at a temperature below which the polymerization promoter causes the free radical initiator to initiate polymerization, (c) applying the powder coating composition to a mold, (d) forming an object with the mold at a temperature at or above which the polymerization promoter causes the free radical initiator to initiate polymerization.

The following tables relate to certain of the foregoing examples of unsaturated polyester resins and powder coating compositions prepared as described above.

|  | Example 3 | Example 6 |
| --- | --- | --- |
| Appearance | Good | Good |
| Wet Out | Good | Fair |
| Release from Mold | Good | Good |
| Gel Time @ 220° F. | 41" | 25" |
| Pill Flow @ 220° F. | 22 mm | 18 mm |
| Tack temperature | 131° | 135° F. |
| 60° Gloss | 43 | 50 |

-continued

|  | Example 3 | Example 6 |
| --- | --- | --- |
| Solvent Resistance | Some marring of surface. | Slight marring of surface. |
| (after 10 MEK double rubs) | Some residue on cloth | No residue on cloth. |
| Crosshatch Adhesion | <5% loss of adhesion | <2% loss of adhesion |

|  | Example 10 | Example 13 |
| --- | --- | --- |
| Appearance | OK | OK |
| Wet Out | Poor | Fair |
| Release | Good | Good |
| Gel time @ 220° F. | 60" | 34" |
| Pill Flow @ 220° F. | 19 mm | 16 mm |
| Tack Temperature | 137° F. | 140° F. |
| 60° Gloss | 25 | 41 |
| Solvent Resistance after 10 MEK double rubs | Obvious marring of surface. Noticeable residue on cloth. | Barely observable marring of surface. No residue on cloth. |
| Crosshatch Adhesion | <25% loss of adhesion | 0% loss of adhesion |

Test results for Example 3 and Example 9 were obtained after the S-Rim molding cycle only. Test results for Example 6 and Example 12 were obtained after a 45 minute @ 149° C. "post-cure" cycle in addition to the original molding cycle.

In the following example, the powders from Example 7, were pre-mixed in a high intensity mixer equipped with a cooling jacket for 1.5 minutes. They were then melt-mixed using a Baker-Perkins 50 mm twin screw extruder. The screw and barrel temperatures were set at 150° F. and the screw was run at 200 rpm. 15–20% torque was produced and the extrudate temperatrues were between 192° F. and 212° F. The extrudate was cooled by passing through a pair of chill rolls. The resultant material was milled and screened through a 100 mesh screen. Powders were then combined in a 50:50 ratio. The powder was sprayed using a corona gun onto a heated 12"×12" plaque tool mounted on a 150 ton press. The temperature of the tool was 220° F. A fiberglass preform was placed on top of the coating, the press was closed and two streams making up a urethane S-RIM formulation were injected.

|  | Example 7 |
| --- | --- |
| Appearance | Good |
| Wet Out | Good |
| Release from Mold | Good |
| Gel Time @ 220° F. | 26" |
| Pill Flow @ 220° F. | 41 mm |
| Tack Temperature | 139° F. |
| 60° Gloss | 69 |
| Solvent Resistance after 10 MEK Double Rubs | No marring of surface. No residue on cloth |
| Crosshatch Adhesion | 0% loss of adhesion |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A powder coating composition comprising a low-temperature physical mixture of a powder (A) comprising a first unsaturated polyester resin and a free radical initiator, and a separate and distinct powder (B) comprising a polymerization promoter.

2. The powder coating composition of claim 1, wherein the powder (A) further comprises a second unsaturated polyester resin.

3. The powder coating composition of claim 1, wherein powder (B) further comprises an unsaturated polyester resin.

4. The powder coating composition of claim 1, wherein the first unsaturated polyester resin has a molecular weight in the range of 1,000 to 10,000.

5. The powder coating composition of claim 2, wherein the second unsaturated polyester resin has a molecular weight in the range of 1,000 to 5,000.

6. The powder coating composition of claim 1, wherein the composition further comprises a diallyl phthalate resin.

7. The powder coating composition of claim 1, wherein the composition further comprises a crystalline unsaturated monomer.

8. The powder coating composition of claim 7, wherein the monomer is selected from the group consisting of diacetone acrylamide, triallyl cyanurate, N,N'-methylene bisacrylamide, N,N'-diallylmelamine, acrylamide, triallylisocyanurate, neopentyl glycol diacrylate, maleinimide, pentaerythritol tetraacrylate, and pentaerythritol triacrylate.

9. The powder coating composition of claim 2, further comprising a third unsaturated polyester resin.

10. The powder coating composition of claim 1, wherein the free radical initiator is selected from peoxides, and diazo compounds.

11. The powder coating composition of claim 10, wherein the free radical initiator is a peroxide selected from diacyl peroxide, di-t-butyl peroxide, dicumyl peroxide, t-butyl cumyl peroxide, benzoyl peroxide, dilauryl peroxide, 2,5-dimethyl-2,5-di(benzoylperoxy)hexane, and tertiary butyl peroxybenzoate.

12. The powder coating composition of claim 1, wherein the polymerization promoter is selected from cobalt salts or oxides, cobalt octanoate, potassium octanoate, dimethyl acetoacetamide, methyl acetoacetate and tertiary amines.

13. A powder coating composition comprising a low-temperature physical mixture of a powder (A) comprising a free radical initiator, and a powder (B) comprising a polymerization promoter, wherein both powder (A) and powder (B) further comprise an unsaturated polyester resin and a crystalline unsaturated monomer.

14. The powder coating composition of claim 13, further comprising a diallyl phthalate resin.

15. A powder coating composition prepared by a process comprising physically mixing a powder (A) comprising an unsaturated polyester resin and a free radical initiator and a powder (B) comprising a polymerization promoter, wherein the powder (A) is made by melt-mixing and subsequently forming the powder (A) after the melt-mixing step, and the physically mixing step is performed at a temperature below which the polymerization promoter causes the free radical initiator to initiate curing.

16. A powder coating composition prepared by the process of claim 14, wherein the powder (B) further comprises an unsaturated polyester resin.

* * * * *